Oct. 13, 1931.  W. L. KEEFER  1,827,586
VIBRATING MECHANISM
Filed Oct. 18, 1930  2 Sheets-Sheet 1
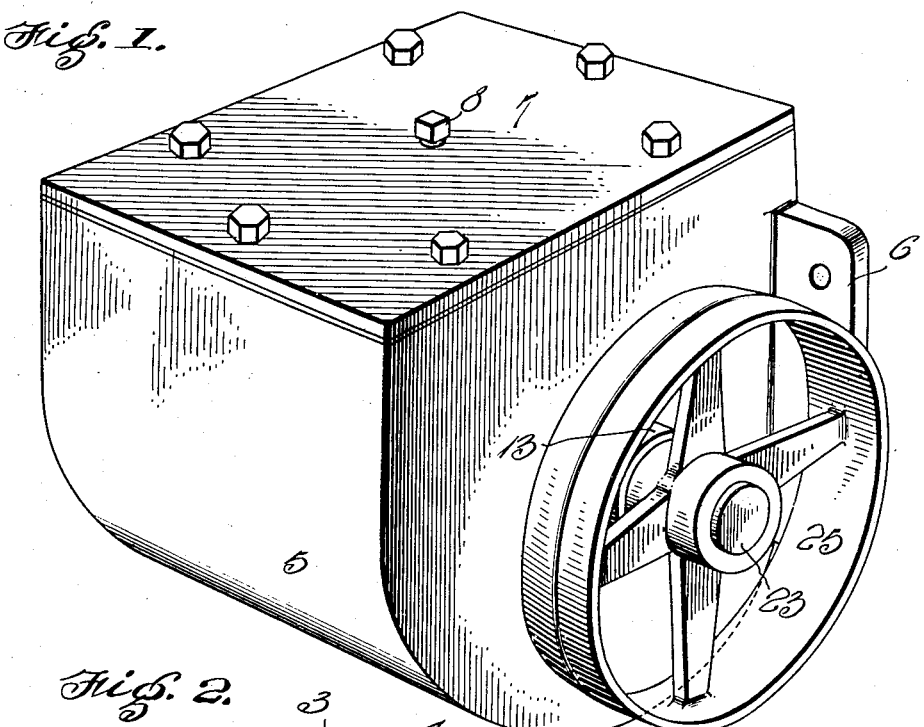
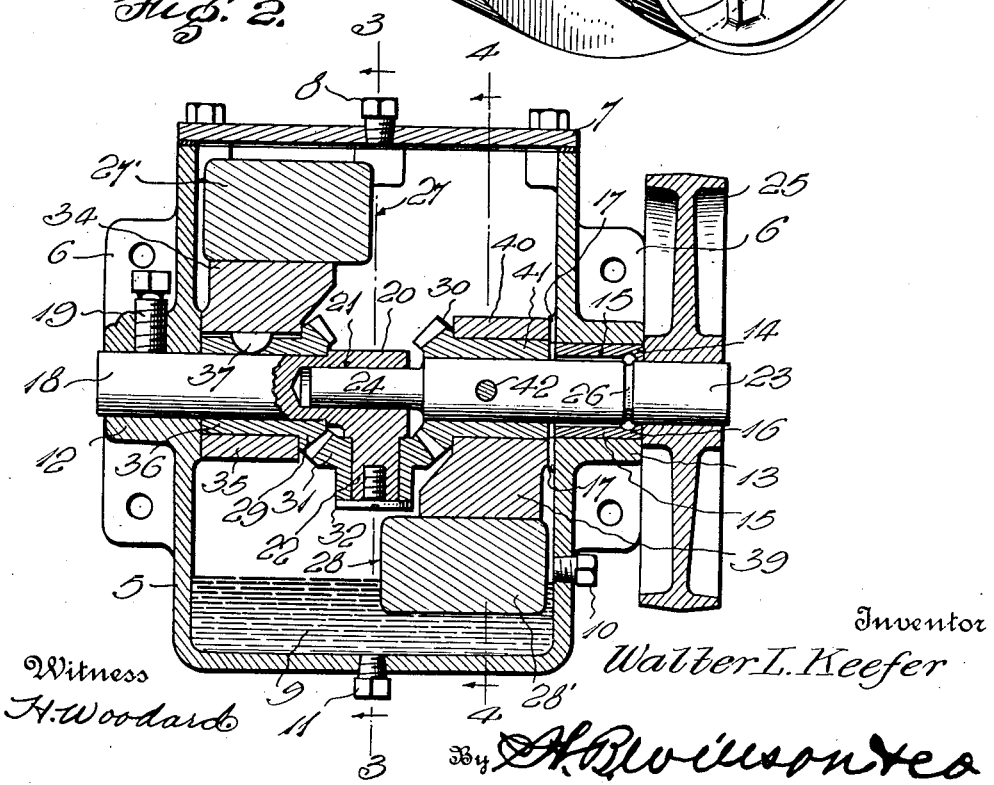
Inventor
Walter L. Keefer
Witness
H. Woodard
By H. B. Wilson &co
Attorneys.

Oct. 13, 1931.  W. L. KEEFER  1,827,586
VIBRATING MECHANISM
Filed Oct. 18, 1930   2 Sheets-Sheet 2

Witness
H. Woodard

Inventor
Walter L. Keefer
By H. Q. Wilson & Co.
Attorneys.

Patented Oct. 13, 1931

1,827,586

UNITED STATES PATENT OFFICE

WALTER L. KEEFER, OF CHAMBERSBURG, PENNSYLVANIA

VIBRATING MECHANISM

Application filed October 18, 1930. Serial No. 489,669.

The invention relates to vibrating mechanisms of the type in which the vibration is produced by rotation of off-center weights. The vibrator is intended primarily for use in vibrating screens or the like, for instance, those used in milling separators, and it is the principal object of the invention to provide a comparatively simple, compact and efficient structure which will produce all necessary vibration but will not have any tendency to cause such excessive vibration as to necessitate the use of restraining means.

With the foregoing in view, the invention resides in the novel subject matter hereinafter described and claimed, description being accomplished by reference to the accompanying drawings.

Fig. 1 is a perspective view of the vibrator.

Fig. 2 is a central vertical longitudinal sectional view.

Figure 3:
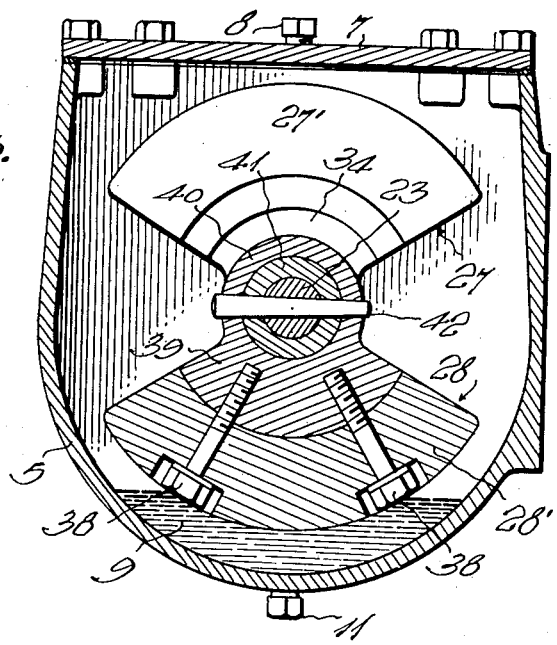
Figs. 3 and 4 are vertical transverse sectional views on the correspondingly numbered lines of Fig. 2.
Figure 4:
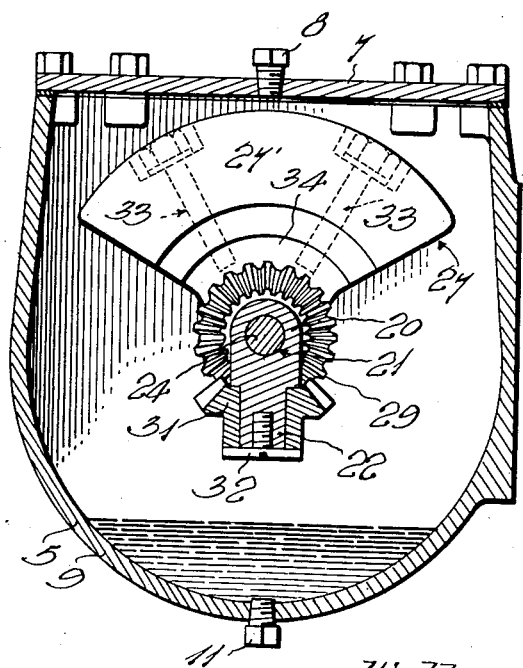

A preferred construction has been illustrated and will be rather specifically described, with the understanding however, that within the scope of the invention as claimed, variations may be made.

The numeral 5 denotes an oil containing casing for the various movable parts, said casing having attaching flanges 6 facilitating connection thereof with a screen frame or other part to be vibrated. A removable cover 7 is provided for the casing 5, allowing easy assembly of casing-contained parts and easy access thereto for repair. This cover 7 may be provided with a plug 8, removal of which allows introduction of a quantity of oil 9 into the casing 5, and another plug 10 may be employed in one side wall of said casing, so that upon removal of said plug 10 and pouring oil into said casing until it reaches the level of the opening previously closed by this plug, it will be insured that the proper quantity of oil will exist in the casing. 11 merely denotes a drain plug in the casing bottom.

Opposed vertical sides of the casing are provided with axially alined bearings 12 and 13, the common axis of said bearings being parallel with the plane in which the flanges 6 are disposed. Both bearings 12 and 13 may well be formed integrally with the casing body, and bearing 13 is provided with an appropriate bushing 14 having oil-conducting ports 15 and an oil groove 16. The groove 16 is located near the outer end of the bushing and is continuous, and the ports 15 lead from this groove through the inner end of the bushing. The inner ends of the ports 15 register with radial ports 17 at the inner end of the bearing 13, and the various ports serve to allow proper travel of oil to lubricate the interior of the bushing 14 and the hereinafter described shaft which rotates therein, the groove 16 serving to exert a restraining influence on the oil, tending to prevent it from leaking at the outer end of the bearing.

A short shaft 18 is snugly received in the bearing 12 and is rigidly secured therein by a set screw 19, the inner end of said shaft 18 being provided with an enlarged integral head 20. This head is provided with a bearing socket 21 and with an integral laterally projecting stud 22. The socket 21 is co-axial with the shaft 18 and opens through the inner extremity of the latter, and the stud 22 is perpendicular to the shaft axis.

A rotatable shaft 23 passes through the bushing 14 and is provided with a reduced inner end 24 rotatably received in the bearing socket 21, the outer end of said shaft 23 being adapted for driving, for which purpose a pulley 25 has been shown upon it. A groove 26 is preferably formed circumferentially of the shaft 23 to register with the groove 16, assisting in restraining oil against leakage from the outer end of the shaft.

An off-center weight 27 is rotatable upon the rigidly secured shaft 18, and a second off-center weight 28 is secured to the rotatable shaft 23. Two beveled gears 29 and 30 which are co-axial with the shafts 18 and 23, rotate bodily with the off-center weights 27 and 28 respectively, and a beveled connecting gear is rotatably carried by the bearing stud 22, said gear 31 meshing with said gears 29 and 30. A large-headed screw 32 is shown for retaining the gear 31 upon the stud 22, but other provision could of course be made for this purpose.

The principal weighted portion 27' of the off-center weight 27, is secured by cap screws or the like 33 to a segment 34 having a hub 35. This hub snugly surrounds a hub 36 on the gear 29 and is keyed to the latter as shown at 37, the gear hub 36 being rotatable upon the fixed shaft 18.

The principal weighted portion 28' of the off-center weight 28, is secured by cap screws or the like 38 to a segment 39 having a hub 40. This hub 40 snugly surrounds a hub 41 on the gear 30, and the parts 23, 40 and 41 are all secured together by a pin 42.

By constructing the vibrator in or substantially in the manner shown and described, it may be easily manufactured at comparatively small expense, yet will be efficient and reliable in operation. Driving of the shaft 23 by belt and pulleys or in other preferred way, causes rotation of the off-center weight 28, and the gear 30 rotating bodily with said weight 28, drives the connecting gear 31, with the result that gear 29 is driven to rotate the off-center weight 27. Rotation of the two off-center weights, produces the required vibration of the entire structure and the machine part to which it is connected.

Attention is again invited to the fact that variations may be made within the scope of the invention as claimed.

I claim:—

1. A vibrating mechanism comprising a support for connection with a part to be vibrated, a bearing carried rigidly by said support, a shaft rigidly secured to said support and projecting toward the inner end of said bearing in axial alinement with the latter, a rotatable shaft passing through said bearing, bearing means whereby the inner end of said rotatable shaft is supported by the inner end of said fixed shaft, an off-center weight secured to the rotatable shaft, a second off-center weight rotatable upon the rigidly secured shaft, two beveled gears co-axial with said shafts and rotatable bodily with said weights respectively, a beveled connecting gear meshing with the first named beveled gears respectively, and means rotatably mounting said connecting gear on said rigidly secured shaft on an axis perpendicular to the latter.

2. A vibrating mechanism comprising a support for connection with a part to be vibrated, a bearing carried rigidly by said support, a shaft rigidly secured to said support and projecting toward the inner end of said bearing in axial alinement with the latter, the inner end of said rigidly secured shaft having a bearing socket co-axial therewith, a rotatable shaft passing through said bearing and having its inner end rotatably received in said bearing socket, an off-center weight secured to the rotatable shaft, a second off-center weight rotatable upon the rigidly secured shaft, two beveled gears co-axial with said shafts and rotatable bodily with said weights respectively, a beveled connecting gear meshing with the first named beveled gears respectively, and means rotatably mounting said connecting gear on said rigidly secured shaft on an axis perpendicular to the latter.

3. A vibrating mechanism comprising a support for connection with a part to be vibrated, a bearing carried rigidly by said support, a shaft rigidly secured to said support and projecting toward the inner end of said bearing in axial alinement with the latter, the inner end of said rigidly secured shaft having a bearing socket co-axial therewith, a rotatable shaft passing through said bearing and having its inner end rotatably received in said bearing socket, an off-center weight secured to the rotatable shaft, a second off-center weight rotatable upon said rigidly secured shaft, two beveled gears co-axial with said shafts and rotatable bodily with said weights respectively, a beveled connecting gear meshing with the first named beveled gears, and a lateral stud perpendicular to and rigid with said rigidly secured shaft, said stud rotatably supporting said connecting gear.

4. A vibrating mechanism comprising a support for connection with a part to be vibrated, a bearing carried rigidly by said support, a shaft rigidly secured to said support and projecting toward the inner end of said bearing in axial alinement with the latter, the inner end of said rigidly secured shaft having an integral enlarged head, a lateral bearing stud integral with said head and a bearing socket in said head, said socket being co-axial with the shaft and said stud being perpendicular to said shaft, a rotatable shaft passing through said bearing and having its inner end rotatably received in said bearing socket, an off-center weight secured to the rotatable shaft, a second off-center weight rotatable upon the rigidly secured shaft, two beveled gears co-axial with said shafts and rotatable bodily with said weights respectively, and a beveled connecting gear rotatably mounted on the aforesaid bearing stud, said connecting gear meshing with the first named gear.

5. A vibrating mechanism comprising a casing having two opposed walls, a short stub shaft rigidly secured to one of said walls and projecting toward the other thereof, a bearing rigidly carried by said other wall in axial alinement with said stud shaft, a rotatable shaft passing through said bearing and having its inner end rotatably supported by the inner end of said stub shaft, said rotatable shaft having a driving member at the exterior of said casing, one off-center weight rotatable upon said stub shaft and having a bevel gear, a second off-center weight secured to said rotatable shaft and having a bevel gear, a connecting gear meshing with the aforesaid gears, and means mounting said connecting gear upon said stub shaft.

6. A vibrating mechanism comprising a casing having two opposed side walls, alined bearings rigidly carried by said walls, a short shaft whose outer end is received in one of said bearings, means non-rotatably securing said short shaft in said one bearing, a rotatable shaft passing through the other bearing and having its inner end rotatably supported by the inner end of the fixed shaft, said rotatable shaft having a driving member at the exterior of the casing, one off-center weight rotatable upon said fixed shaft and having a bevel gear, a second off-center weight secured to said rotatable shaft and having a bevel gear, a connecting gear meshing with the aforesaid gears, and means mounting said connecting gear on the inner end of said fixed shaft.

In testimony whereof I affix my signature.

WALTER L. KEEFER.